April 24, 1928.

A. P. JAHANT 1,667,036

MOLD ENGRAVING MACHINE

Filed March 3, 1927   4 Sheets-Sheet 2

INVENTOR.
AUGUSTUS P. JAHANT.
BY Ely T Barrow
ATTORNEYS.

April 24, 1928.                                                    1,667,036
A. P. JAHANT
MOLD ENGRAVING MACHINE
Filed March 3, 1927                     4 Sheets-Sheet 3

INVENTOR.
AUGUSTUS P. JAHANT.
BY
ATTORNEYS.

April 24, 1928.  1,667,036

A. P. JAHANT
MOLD ENGRAVING MACHINE
Filed March 3, 1927   4 Sheets-Sheet 4

INVENTOR.
Augustus P. Jahant.
BY
ATTORNEYS.

Patented Apr. 24, 1928.

1,667,036

UNITED STATES PATENT OFFICE.

AUGUSTUS P. JAHANT, OF AKRON, OHIO, ASSIGNOR TO THE AKRON STANDARD MOLD COMPANY, OF AKRON, OHIO, A CORPORATION OF OHIO.

MOLD-ENGRAVING MACHINE.

Application filed March 3, 1927. Serial No. 172,249.

This invention relates to machines for use in engraving or cutting operations where a repetition of a given pattern is repeated about the surface of the articles. Specifically it relates to machines for automatically engraving tread designs in rubber molds in which a rotating, pattern controlled, milling cutter is operated by suitable cam or pattern control to oscillate transversely of the mold while the mold is oscillated about its axis, the combination of these movements reproducing the desired pattern in the mold. Each pattern occupies a certain area about the mold and is repeated, so that it becomes necessary, after each cutting operation to space the mold, or to move the mold to the position when the next cutting operation is to take place, at which time the cutting tool is freed from the mold.

The rotation of the mold during the spacing operation and the oscillation during the cutting operation are usually derived from a single drive shaft. During the spacing operation the machine is idle, except for the spacing movement, and it is possible by this invention to rotate the driving shaft for the mold at a higher speed than during the cutting, thereby increasing the productive capacity of the machine.

The object of the present invention is to devise a mechanism which will automatically speed up the rotation of the mold during the spacing operation and thereby attain the increased efficiency. In machines heretofore constructed the movement of the mold or mold carrying turntable is at the same rate during both operations. In the described construction the speed is materially increased during the spacing operation.

It is apparent that the invention may be applied to mold cutting machines in which the tool is rotated about the mold and the claims are to be construed broad enough to cover this modification, where the restrictions to the other form are not definitely stated. It will also be apparent that the invention is not limited to the cutting of tire molds but may be embodied in machines for other purposes as well.

The particular embodiment of the invention is shown in combination with an automatic mold engraving machine which is the invention of Andrew J. Flieter and Theodore A. Miller of Akron, Ohio, covered in their application for patent, Serial No. 98,477, filed March 30, 1926, to which reference should be made for a more complete understanding of the mechanism other than the improvement covered herein. The invention, in its broader aspects, however, is not limited to this machine and may be incorporated in other engraving machines.

Generally speaking the present invention embodies a two speed motor, and automatically operative controls whereby the motor is run at low speed during the cutting operation and shifted to high speed during the spacing, the motor driving the shaft which rotates the mold supporting turntable during both operations. Separate low and high speed motors may be employed and the invention is not necessarily limited to a single motor. It is illustrated however with a compound wound alternating current motor, the wiring diagrams shown herein being for that particular type of motor. Other types of motors may be employed and the wiring changed to suit as is well known to those skilled in the art.

In the drawing and the specification accompanying this application sufficient of the machine has been shown to enable the construction and operation of the improvement thereon to be understood.

Figure 1:
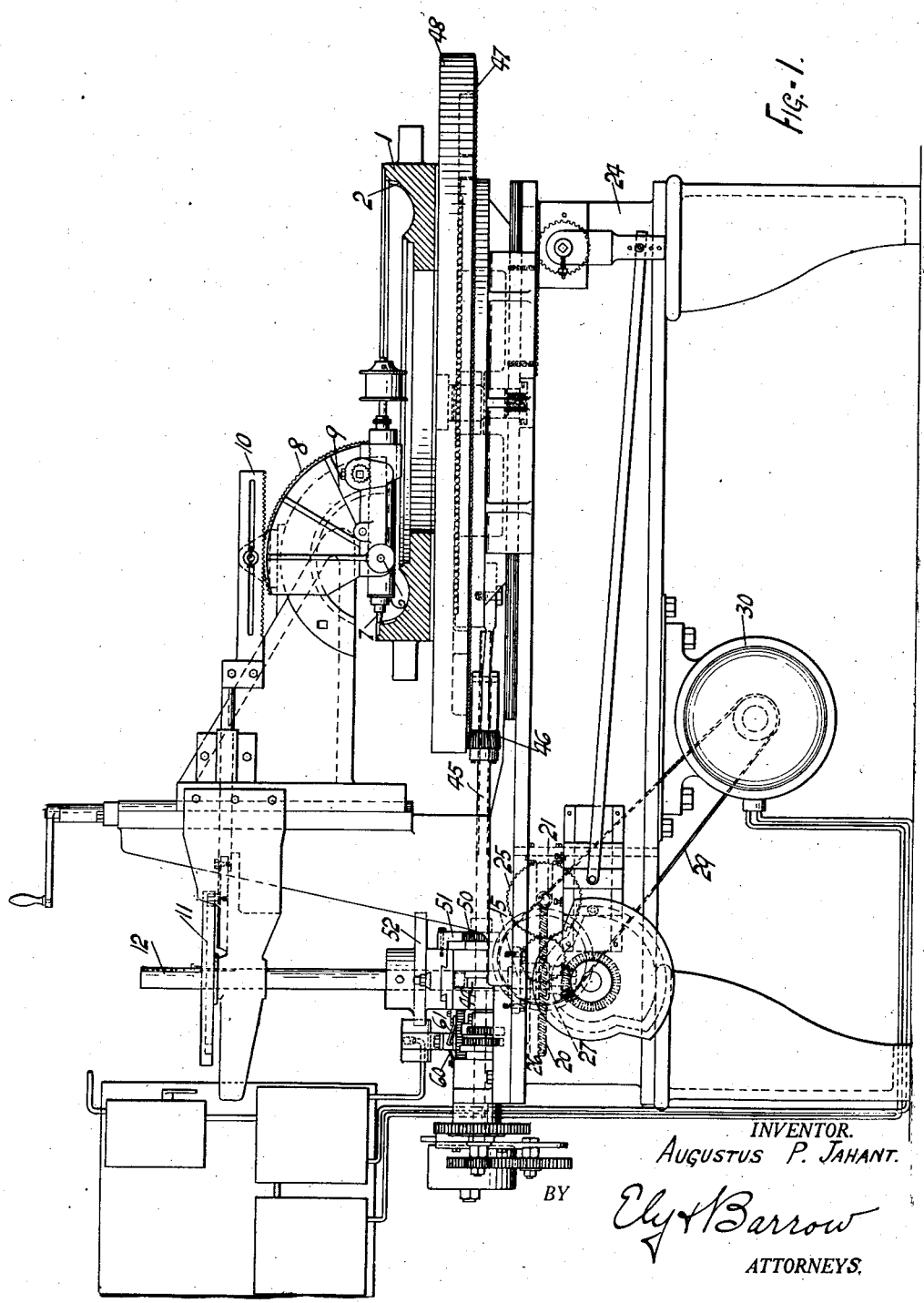
Figure 1 is a side elevation of a complete mold cutting or engraving machine with the improvements shown incorporated therein.
Figure 2:
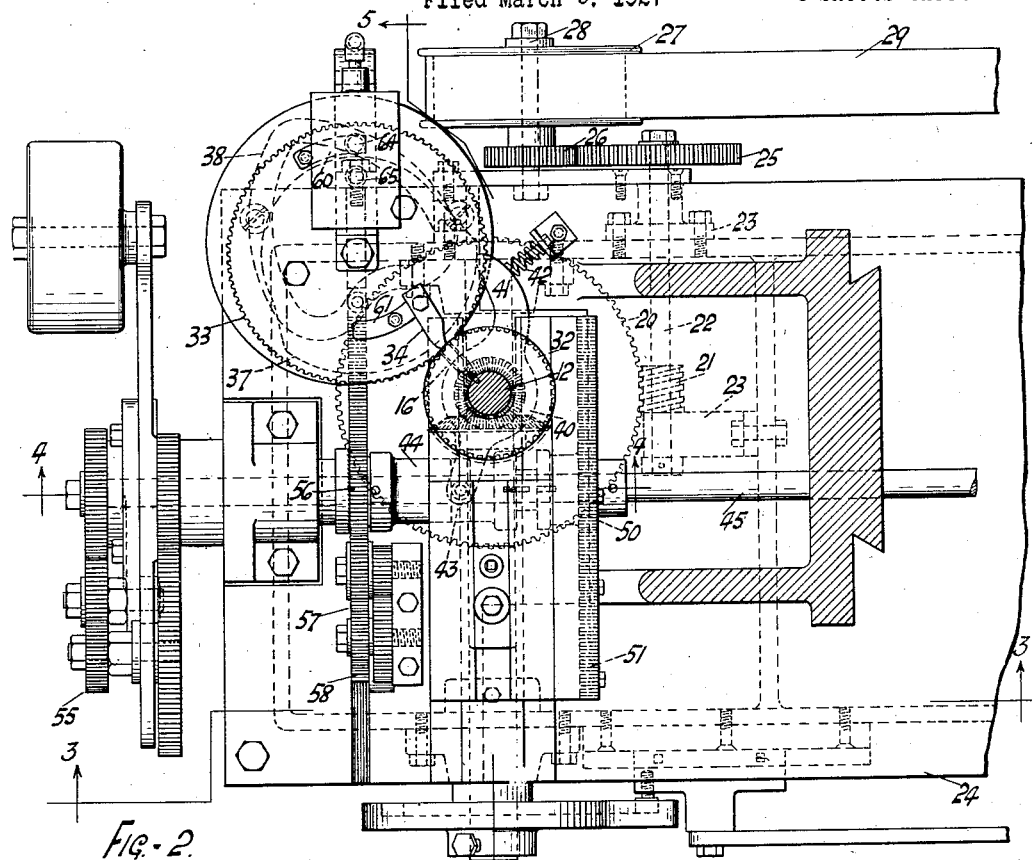
Figure 2 is an enlarged plan view of the gearing by which the turntable rotating shaft is driven during the two operations of cutting and spacing.
Figure 3:
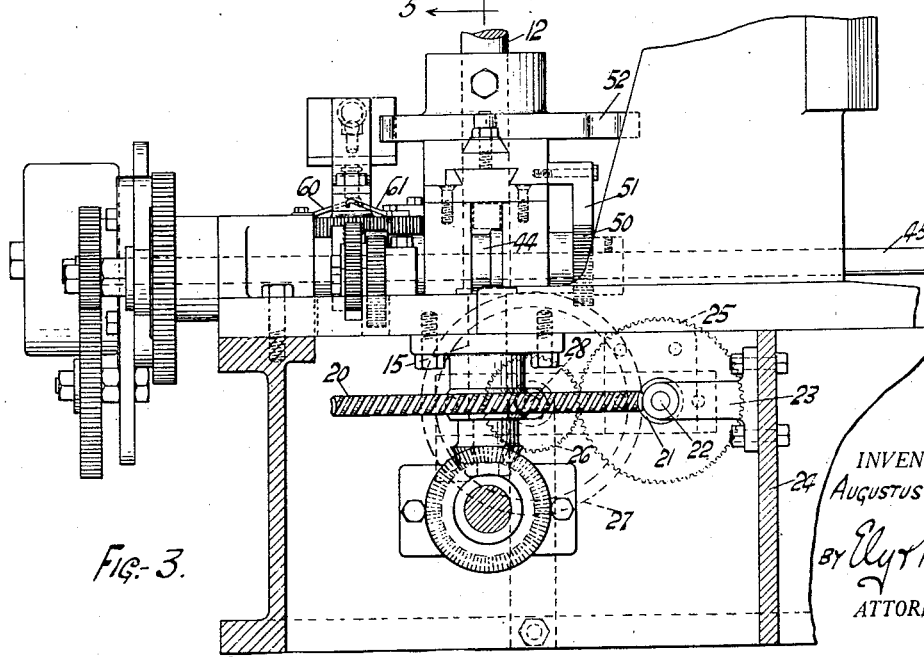
Figure 3 is a section on the line 3—3 of Figure 2.
Figure 4:
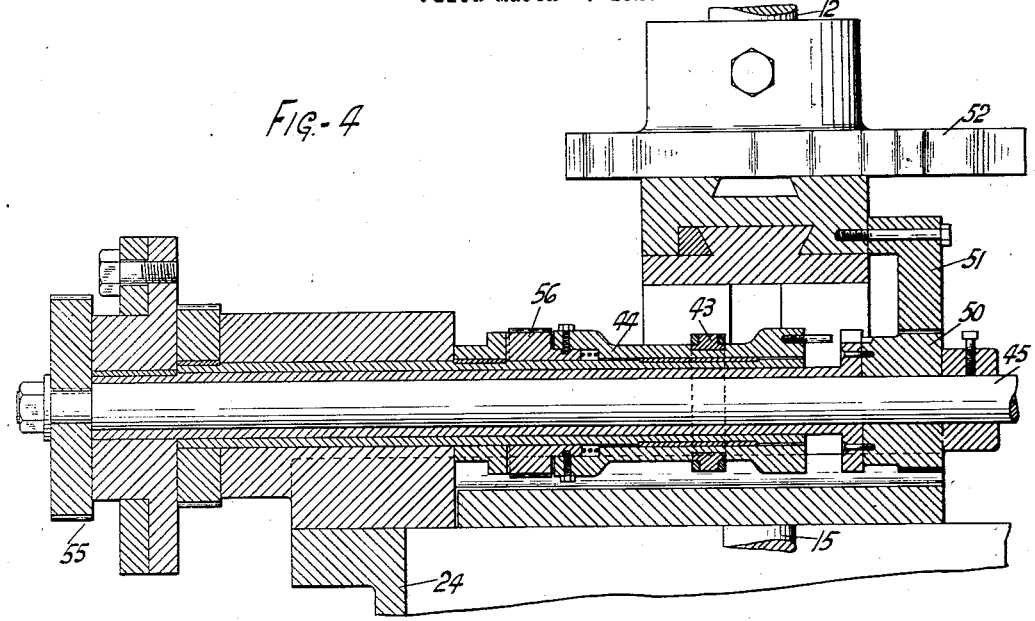
Figure 4 is a section on the line 4—4 of Figure 2.
Figure 5:
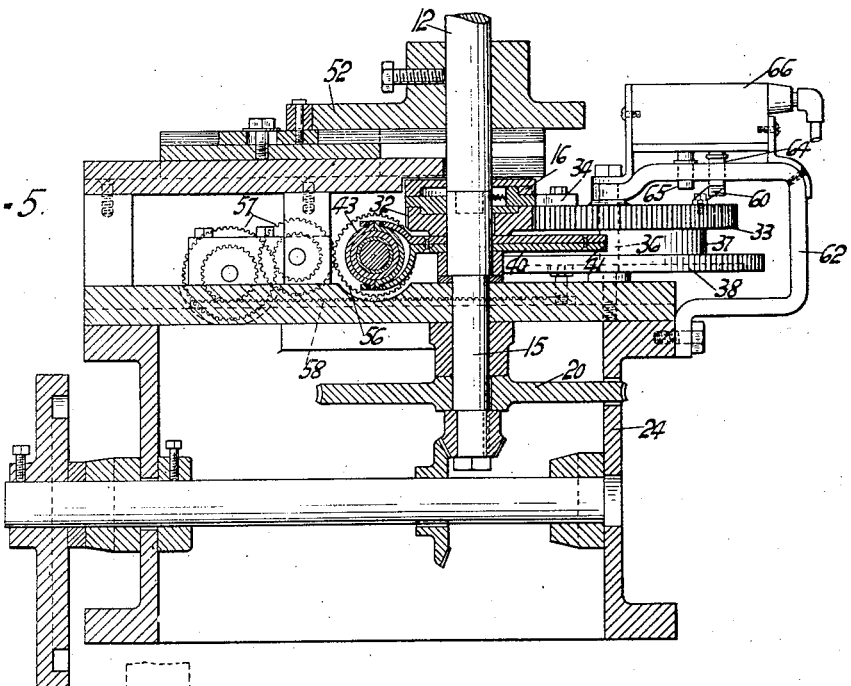
Figure 5 is a section on the line 5—5 of Figure 2.
Figure 6:
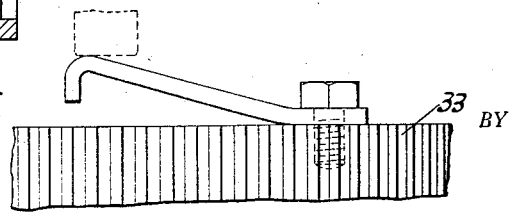
Figure 6 is a detail of the device for operating the control buttons or plungers.
Figure 7:
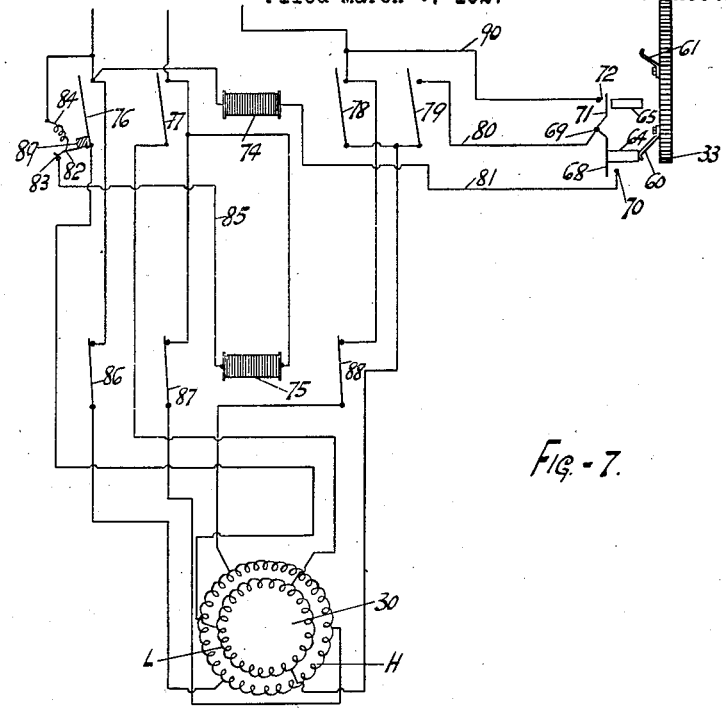
Figure 7 is a diagram of the wiring showing the position of the parts and circuits during the high speed operation of the motor.
Figure 8:
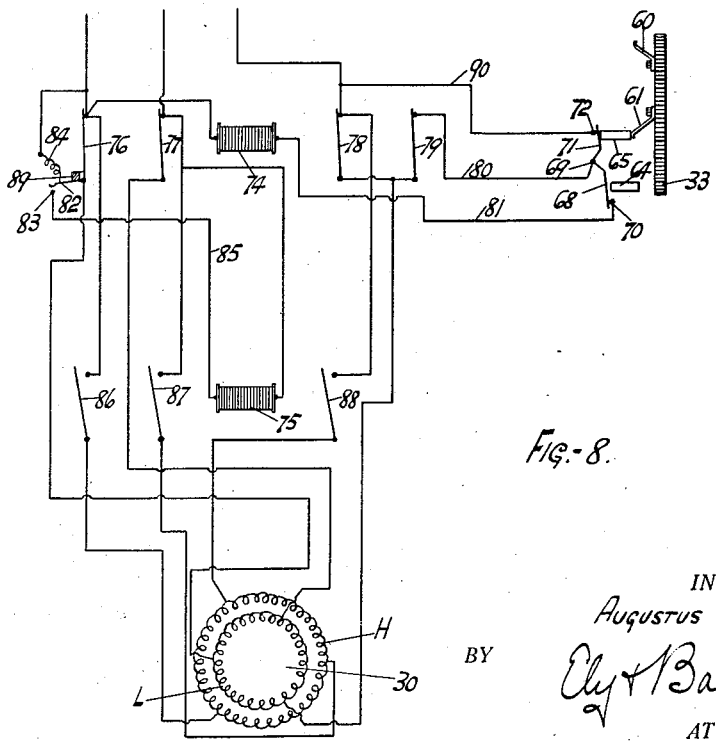
Figure 8 is a similar view showing the position of the parts and circuits during the low speed operation of the motor.

The tire mold is shown at 1, the tread thereof, or that portion to be cut away or engraved by the machine, being indicated at 2, the tread being formed in an arc transversely of the mold on the axis, on center of which is located the pivot 6 of the oscillating cutting tool 7. The cutting tool is oscillated during the cutting operation by means of a gear segment 8 attached to the tool carrier 9 and engaged by a reciprocating rack 10. The movement of this rack is controlled by a cam 11 mounted upon a vertical shaft 12 at the rear of the machine. Full details of the mechanism for controlling the oscillation of the cutting tool are not necessary for an understanding of the invention, it being necessary merely to state that the shaft 12 is periodically connected and disconnected from a main shaft 15 at the base of the machine, with which it is aligned and connected during the cutting intervals by a clutch designated generally at 16.

The main shaft 15 is rotated constantly by means of a worm gear 20 driven by a worm 21 on the intermediate shaft 22, mounted in the brackets 23 on the base 24 of the machine. The shaft 22 carries at its outer end a gear 25 which meshes with a gear 26 revolved by a pulley 27 and mounted on a shaft 28 at the side of the base. A belt 29 connects the pulley 27 with a two speed motor 30 attached to the base or bed of the machine.

The upper end of the shaft 15, which is driven at the two speeds by the motor 30 through the gearing described, has fixed to its upper end a gear 32 which carries in its upper surface the clutch 16. This gear meshes with a gear 33, the gear 33 being twice the size of the gear 32 carries a finger 34 which contacts with and operates the clutch 16 upon its complete revolution which takes place after every two revolutions of the gear 32 so that the shaft 12 and the shaft 15 are intermittently connected and disconnected. When the shafts are connected the cutting operation is taking place, and when they are disconnected the spacing operation is taking place, as will be understood by further reference to the pending application mentioned above.

The gear 33 is secured to a vertical shaft 36 which also carries cam 37 and a heart shaped cam 38. A lever 40 is pivoted in the shaft 15, and is provided with a tail 41 which is forced against the cam 37 by a spring 42. The opposite end of the lever is bifurcated and engages a collar 43 which is mounted on a shiftable clutch 44 having means at its opposite ends to connect the mold rotating mechanism with the high or low speed drives for the spacing or cutting, respectively. Without entering into a detailed discussion of these elements which form no part of my invention, it may be stated that the clutch 44 is slidably mounted upon the shaft 45 which extends across the machine and carries a bevel gear 46 which meshes with a bevel gear 47 forced in the lower side of a mold supporting turntable 48. At the right hand limit of its movement the clutch 44 connects the shaft 45 with a gear 50, which is oscillated by a rack 51, which is in turn operated by a cam 52 on the shaft 12. The connection which has been described oscillates the mold table during the cutting operation.

The forward movement or advancement of the mold to its next position is obtained by the movement of the clutch 44 to the left which connects the shaft 45, through the gearing 55 to the pinion 56, which latter is rotated through gearing 57 from the reciprocating rack 58. This rack is operated by the heart shaped cam 38.

It will be seen therefore, that the rotation of the shaft 15 is equally divided between periods of cutting and spacing determined by the position of the clutch 44. In the machines of this type heretofore, a constant speed motor has been employed to drive the machine during the entire operation. By employing a two speed motor operative at low speed during the cutting and at high speed during the spacing operation the output of the machine is greatly increased. In the embodiment of the invention illustrated here the change from low to high speed is automatically controlled by the mechanism to be described.

Attached to the upper face of the gear 33 are two diametrically opposite fingers or cams 60 and 61, the former being at the outer edges of the gear and the latter some distance inwardly of the gear. Arranged at the side of the machine and overhanging the gear 33 is a bracket 62 in which are mounted two spring or gravity actuated buttons 64 and 65 in the path of the cams 60 and 61 respectively and adapted to be moved upwardly by the said cams. In a box 66 above these buttons are arranged the switches for controlling the high and low speed connections for the motor 30. In alignment with the button 64 is a normally closed switch 68 which extends across the terminals 69 and 70, and in alignment with the button 65 is a normally open switch 71 which extends across the terminals 69 and 72.

In the wiring as shown, there are situated two magnets or solenoids 74 and 75, the former being designated as the high speed solenoid and the latter as the low speed solenoid. Movable in unison by the high speed magnet are four switches 76, 77, 78 and 79, the first three of which conduct the current to the low speed winding L of the motor and the fourth closes a secondary circuit comprising the wiring 80 and 81 through the switch 68 to the magnet 74, thereby maintaining the current into the motor during the entire period of the slow speed or cutting operation. When the machine arrives at the end of the cutting operation the finger 60 moves the button 64 in contact with the switch 68 opening the circuit 80—81 deenergizing the magnet 74 and releasing the switches 76, 77, 78 and 79 thereby stopping the slow speed rotation of the motor.

When the switch 76 is released it drops by gravity or other means whereupon an arm 82 carried thereby and insulated from the main portion of the arm at 89, moves over into contact with the terminal 83 closing the circuit through the wiring 84 and secondary circuit 85 to the high speed magnet 75. When the magnet is energized the switches 86, 87 and 88 are closed to complete the circuit to the high speed windings H of the motor. This condition remains until the finger 61 in the cam strikes the button 65 whereupon the switch 71 is closed permitting current to pass through the wiring 90—80 to the magnet 74 which moves the switches 76, 77, 78 and 79 to the low speed position and opens the circuit at the point 83, whereupon the high speed magnet is deenergized, the switches 86, 87 and 88 are opened.

The particular method employed for obtaining the low and high speeds is not essential to all embodiments of the invention as other forms of devices for this purpose may be employed. I believe, however, that this is the first embodiment of a device for use in combination with a mold engraving machine whereby the machine is speeded up between the cutting operations and as such the claims herein are entitled to as substantial a range of equivalents as may freely fall within the scope thereof.

What is claimed is:

1. In a machine for cutting tire molds with repeated units of design, a rotatable mold and an oscillatory cutter head movable transversely of the mold, and means to rotate the mold during periodic intervals of cutting and spacing, said means being accelerated during the spacing interval over the speed during the cutting intervals.

2. In a machine for cutting tire molds a turntable for supporting the mold, a shaft for rotating the turntable, a two speed electrical power device for rotating the shaft during periodic intervals of cutting and spacing and a device for automatically accelerating the speed of the power device during the spacing.

3. In a machine for cutting repetitions of designs in tire molds, a turntable for supporting the mold, a shaft for rotating the turntable, a two speed motor for driving the shaft continuously during successive periods of fast and slow speed, and mechanism controlled by the machine for automatically changing the speed of the motor when a cutting operation is completed.

4. In a machine for cutting repetitions of units of design in an article, a work support, means for moving the work support during the cutting operation and during the spacing operation between units of design comprising, a two speed motor for actuating the work support, and automatically operative control devices for accelerating the speed of the motor at the end of each cutting operation.

5. In a machine for cutting repetitions of units of design in an article, a work support, means for moving the work support during the cutting operation and during the spacing operation between units of design comprising, a two speed motor for actuating the work support, and automatically operative control devices for accelerating the speed of the motor at the end of each cutting operation and decreasing the speed of the motor at the end of each spacing operation.

6. In a machine for cutting repetitions of units of designs in a tire mold, a rotatable turntable for the mold, a shaft for driving the turntable, gearing for driving the shaft during the spacing operation between units and gearing for oscillating the shaft during the cutting operation, a control device for rendering the sets of gearing operative intermittently, a two speed motor for driving the shaft, and automatically operative controls for changing the speed of the motor in unison with the operation of the control device.

7. In a machine for cutting repetitions of units of designs in a tire mold, a rotatable turntable for the mold, a shaft for driving the turntable, gearing for driving the shaft during the spacing operation between units, gearing for oscillating the shaft during the cutting operation, a control device for rendering the sets of gearing operative intermittently, a two speed motor for driving the shaft, and automatically operative controls for changing the speed of the motor in unison with the operation of the control device to accelerate the motor during the spacing operation and retard the motor during the cutting operation.

8. In a machine for the uses and purposes set forth, a rotatable turntable for receiving a tire mold, a shaft for rotating the turntable, a two speed electrical power device, a tool movable over the mold, mechanism between the motor and the shaft for oscillating the shaft and rotating it in successive intervals, and control devices for varying the speed of the power device concurrently with the beginning of each said interval.

9. In a machine for the uses and purposes set forth, a rotatable turntable for receiving a tire mold, a shaft for rotating the turntable, a two speed motor, a tool movable over the mold, mechanism between the motor and the shaft for oscillating the shaft and rotating it in successive intervals, and control devices for varying the speed of the motor concurrently with the beginning of each said interval.

AUGUSTUS P. JAHANT.